(12) United States Patent
Saito

(10) Patent No.: US 11,914,175 B2
(45) Date of Patent: Feb. 27, 2024

(54) ELECTRONIC PEN

(71) Applicant: SEIKO EPSON CORPORATION, Tokyo (JP)

(72) Inventor: Atsushi Saito, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 18/192,651

(22) Filed: Mar. 30, 2023

(65) Prior Publication Data

US 2023/0314670 A1    Oct. 5, 2023

(30) Foreign Application Priority Data

Mar. 31, 2022    (JP) .................. 2022-060981

(51) Int. Cl.
| | |
|---|---|
| *G02B 5/18* | (2006.01) |
| *G06F 3/03* | (2006.01) |
| *G06F 3/0354* | (2013.01) |
| *G06F 3/038* | (2013.01) |

(52) U.S. Cl.
CPC ............. *G02B 5/18* (2013.01); *G06F 3/0308* (2013.01); *G06F 3/03545* (2013.01); *G02B 2005/1804* (2013.01); *G06F 3/0383* (2013.01); *G06F 3/0386* (2013.01)

(58) Field of Classification Search
CPC ...... G02B 5/18; G06F 3/03545; G06F 3/0308
USPC ........................................................ 345/179
See application file for complete search history.

(56) References Cited

U.S. PATENT DOCUMENTS

| | | | |
|---|---|---|---|
| 2004/0041798 A1 | 3/2004 | Kim | |
| 2010/0085471 A1* | 4/2010 | Craven-Bartle | G06F 3/0321 |
| | | | 348/E5.022 |
| 2012/0162145 A1* | 6/2012 | Knee | G06K 17/0025 |
| | | | 235/494 |

FOREIGN PATENT DOCUMENTS

JP    2004-139562    5/2004

\* cited by examiner

*Primary Examiner* — Calvin C Ma
(74) *Attorney, Agent, or Firm* — JCIPRNET

(57) ABSTRACT

An electronic pen includes a light source configured to emit irradiation light, a rotating body configured to rotate and to reflect the irradiation light emitted from the light source, a first detection member configured to receive the irradiation light reflected by the rotating body, and a first diffraction element provided at an optical path from the light source to the first detection member and configured to diffract the irradiation light.

13 Claims, 17 Drawing Sheets

ELECTRONIC PEN

The present application is based on, and claims priority from JP Application Serial Number 2022-060981, filed Mar. 31, 2022, the disclosure of which is hereby incorporated by reference herein in its entirety.

BACKGROUND

1. Technical Field

The present disclosure relates to an electronic pen that can perform a movement of a pointer or a cursor, and a click operation.

2. Related Art

A pointing device including a light source, a ball that rotates according to a movement of the entire device, and an optical image sensor that detects the movement of the device with an image has been known (JP-A-2004-139562). The device in JP-A-2004-139562 irradiates the ball with irradiation light from the light source, receives the irradiation light reflected by the ball by the optical image sensor, and thus detects a movement direction.

In the device in JP-A-2004-139562, a space such that an optical path length from the ball to the optical image sensor can be sufficiently secured is required inside the device, and thus an increase in size of the pointing device itself is concerned.

SUMMARY

An electronic pen according to one aspect of the present disclosure includes a light source configured to emit irradiation light, a rotating body configured to rotate and to reflect the irradiation light emitted from the light source, a first detection member configured to receive the irradiation light reflected by the rotating body, and a first diffraction element provided at an optical path from the light source to the first detection member and configured to diffract the irradiation light.

DESCRIPTION OF EXEMPLARY EMBODIMENTS

First Embodiment

A first embodiment of an electronic pen according to the present disclosure will be described below in detail with reference to FIG. 1 and the like.

Figure 1:
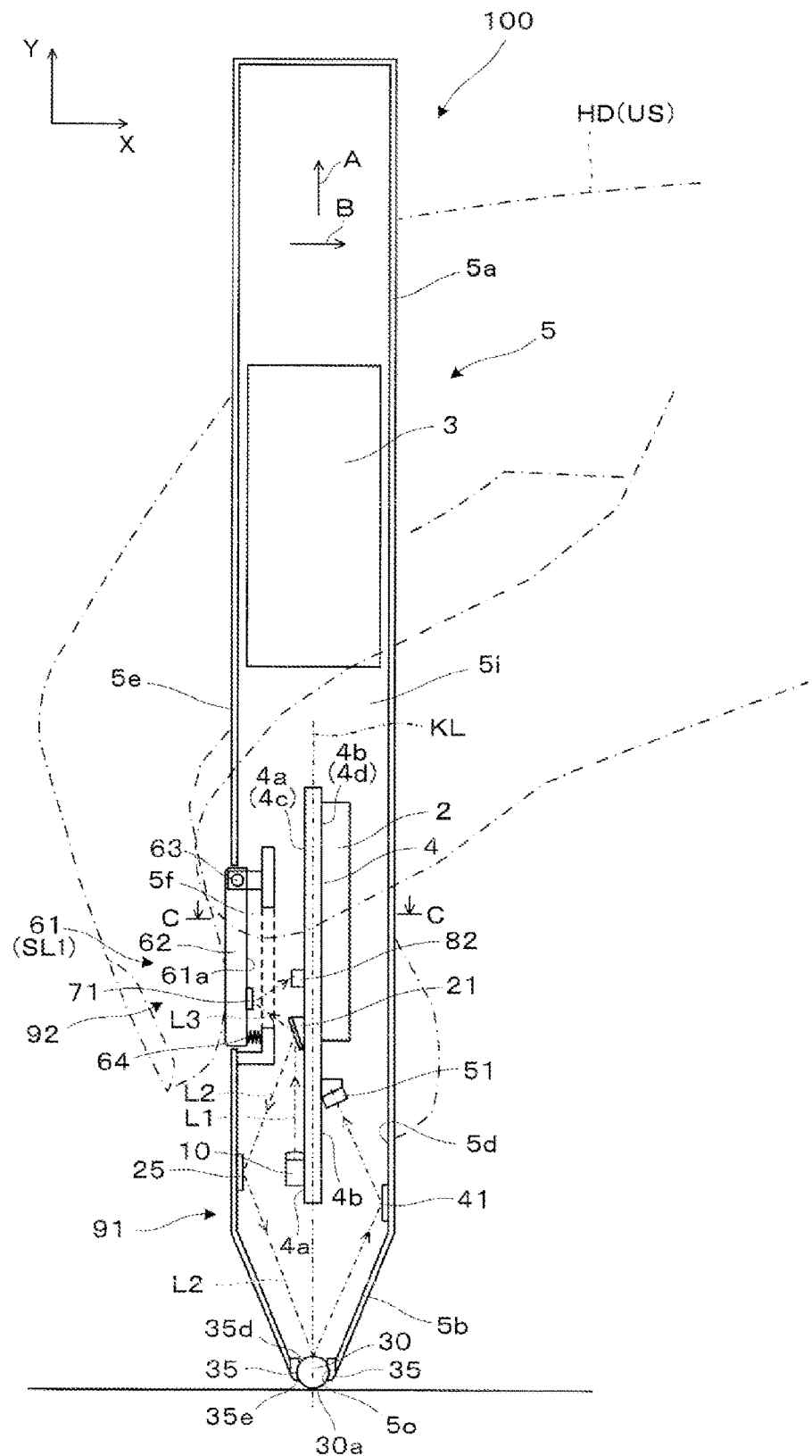
FIG. 1 is a longitudinal cross-sectional view for illustrating an electronic pen according to a first embodiment.

FIG. 1 is a side cross-sectional view of an electronic pen 100. The electronic pen 100 is a pen-type mouse that accompanies a computer, and can perform a movement of a pointer or a cursor displayed on a display and the like, and a click operation by a hand HD of a user US holding and operating a pen shaft main body 5a of the electronic pen 100. The electronic pen 100 is not limited to an upright state as illustrated, and can accurately perform an operation even when the electronic pen 100 is inclined at any angle within a predetermined range.

The electronic pen 100 includes a light source 10, a first diffraction element 21, a first reflection member 25, a rotating body 30, a second reflection member 41, a first detection member 51, a movable member 61, a third reflection member 71, a second detection member 82, a control unit 2, a power source 3, a substrate 4, and a housing 5. In the electronic pen 100, the light source 10, the first diffraction element 21, the first reflection member 25, the rotating body 30, the second reflection member 41, and the first detection member 51 function as an operation direction acquisition unit 91. The operation direction acquisition unit 91 acquires information about an operation amount and an operation direction of the electronic pen 100. Further, the light source 10, the first diffraction element 21, the movable member 61, the third reflection member 71, and the second detection member 82 function as an operation detection unit 92. The operation detection unit 92 detects that a specific operation such as a click is performed in the electronic pen 100. The light source 10 and the first diffraction element 21 are a common optical element that functions as the operation direction acquisition unit 91 and the operation detection unit 92.

As described above, the light source 10, the first diffraction element 21, and the first reflection member 25 constitute a first light projection system in the operation direction acquisition unit 91, and the second reflection member 41 and the first detection member 51 constitute a first light reception system. Further, the light source 10 and the first diffraction element 21 constitute a second light projection system in the operation detection unit 92, and the second detection member 82 constitutes a second light reception system.

The housing 5 is a vertically oriented tubular member, and corresponds to an electronic pen housing. The housing 5 includes the pen shaft main body 5a and a pen point 5b. The pen shaft main body 5a is a main body portion of the housing 5, and has a tubular shape having a substantially constant material thickness. The pen point 5b is a portion to which the rotating body 30 is attached, and has a taper shape that tapers downward. The light source 10, the first diffraction element 21, the first reflection member 25, the rotating body 30, the second reflection member 41, the first detection member 51, a part of the movable member 61, the third reflection member 71, the second detection member 82, the control unit 2, the power source 3, and the substrate 4 are housed in an internal space 5i of the housing 5. The light source 10, the first diffraction element 21, and the second detection member 82 are fixed to a first flat surface 4a of the substrate 4 facing the movable member 61, and the first detection member 51 and the control unit 2 are fixed to a second flat surface 4b of the substrate 4 on an opposite side to the first flat surface 4a. The first reflection member 25 and the second reflection member 41 are fixed to an inner side surface 5d of the housing 5 directly or via a member (not illustrated). The movable member 61 is supported by the pen shaft main body 5a and exposed to the inside and the outside.

The substrate 4 is a plate member, and is disposed in a lower portion of the pen shaft main body 5a in the internal space 5i of the housing 5. Various electronic components including the light source 10, the first detection member 51, the second detection member 82, the control unit 2, and the like, and a circuit pattern are mounted on the substrate 4.

Figure 2:
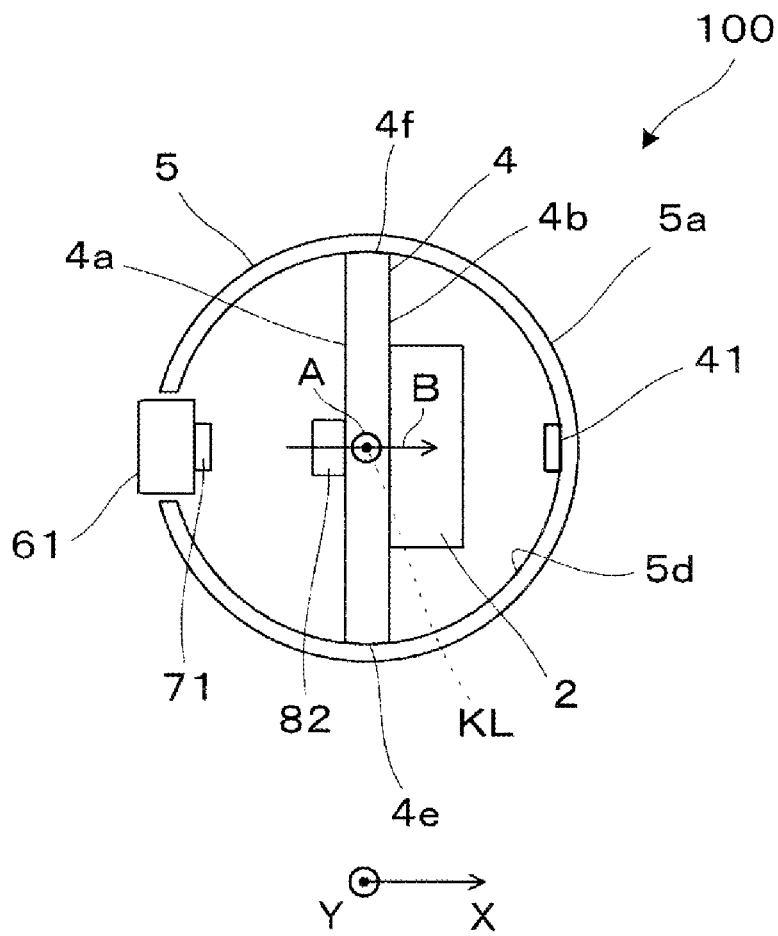
FIG. 2 is a transverse cross-sectional view of the electronic pen taken along a line C-C.

As illustrated in FIG. 2, the substrate 4 is fixed so as to be sandwiched between two facing portions of the inner side surface 5d of the pen shaft main body 5a at end portions 4e and 4f of the substrate 4 in a horizontal direction such that the first flat surface 4a of the substrate 4 faces the movable member 61 substantially in parallel. The substrate 4 is disposed so as to pass through the center of the rotating body 30 disposed at the center of the pen point 5b. In the cross-sectional views of FIGS. 1 and 2, a virtual line KL passing through the substrate 4 along a first direction A or a Y direction in which the housing 5 extends passes between the first flat surface 4a corresponding to one end 4c of the substrate 4 in a second direction B intersecting the first direction A, and the second flat surface 4b corresponding to another end 4d. In the present embodiment, the virtual line KL coincides with a central axis of the pen shaft main body 5a. In this way, optical elements can be disposed at both sides of the substrate 4, and space saving can be achieved. Further, by disposing the substrate 4 near the center of the housing 5, a relatively large area of the substrate 4 can be secured.

With reference to FIG. 1, the light source 10 emits irradiation light L1. The light source 10 is disposed in a lower portion of the first flat surface 4a of the substrate 4. Further, the light source 10 is disposed between the rotating body 30 and the first diffraction element 21 in a side cross-sectional view or a longitudinal cross-sectional view. Examples of the light source 10 include laser, an LED, and the like. When laser is used as the light source 10, power consumption can be further reduced while improving detection accuracy. Note that, when the light source 10 is laser and an LED, a light flux cross section can be adjusted by providing a lens in a light source exit.

The first diffraction element 21 diffracts the irradiation light L1 emitted from the light source 10. The first diffraction element 21 is disposed at an optical path from the light source 10 to the first detection member 51. In the illustrated example, the first diffraction element 21 is disposed at an optical path from the light source 10 to the rotating body 30. Further, the first diffraction element 21 is disposed between the second detection member 82 and the light source 10 at the first flat surface 4a of the substrate 4 in the side cross-sectional view. When laser is used as the light source 10, a radiation angle can be smaller than that of an LED, and thus a configuration for the irradiation light L1 to branch is only the first diffraction element 21, and an optical guide and a lens component are easily omitted.

The first diffraction element 21 includes at least one of a reflection-type diffraction element or a transmission-type diffraction element. In the illustrated example, the first diffraction element 21 is formed of a reflection-type diffraction element. In the illustrated example, the first diffraction element 21 is a volume hologram.

Figure 3:
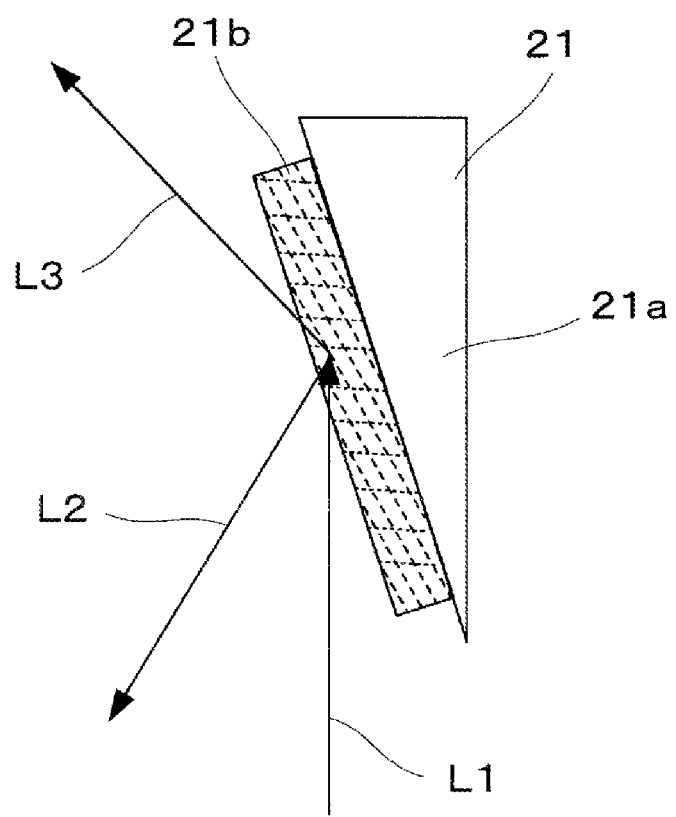
FIG. 3 is an enlarged view for illustrating a first diffraction element of the electronic pen.

As enlarged and illustrated in FIG. 3, the first diffraction element 21 includes a base portion 21a having a wedge shape, and a multilayer volume hologram layer 21b formed at the base portion 21a. A two-branch volume hologram fringe is built in the volume hologram layer 21b. The volume hologram fringe is, for example, a fringe in which two kinds of interference patterns are recorded in three dimensions, and two kinds of refractive indexes of diffraction patterns or fringes are combined. The first diffraction element 21 diffracts irradiation light L2 being a part of the irradiation light L1 emitted from the light source 10 toward the rotating body 30, and diffracts irradiation light L3 being another part toward the second detection member 82. In this way, power consumption of the electronic pen 100 can be suppressed by a configuration in which the number of the light source 10 is one, and the irradiation light L1 from the light source 10 branches to two light beams by the first diffraction element 21. In the first diffraction element 21, the fringe of the volume hologram can be appropriately provided with a lens effect. Further, spread of a radiation angle of an LED and laser can be further suppressed by the lens effect. Note that the first diffraction element 21 may be a surface relief hologram. The surface relief hologram includes a resin layer in which a three-dimensional hologram is formed as a relief surface at a front surface of the base portion.

Returning to FIG. 1, the first reflection member 25 is a flat surface mirror having a small size, and reflects, toward the rotating body 30, the irradiation light L2 diffracted by the first diffraction element 21. The first reflection member 25 is disposed at an optical path from the first diffraction element 21 to the rotating body 30. Further, the first reflection member 25 is disposed in a substantially intermediate height position between the movable member 61 and the rotating body 30 at the inner side surface 5d of the pen shaft main body 5a in the side cross-sectional view.

The rotating body 30 can reflect the irradiation light L2 (a part of the irradiation light L1) emitted from the light source 10, and can rotate in a free direction. The rotating body 30 fits in a bearing member 35 provided around an opening portion 5o of the pen point 5b. The bearing member 35 rotatably supports the rotating body 30. With the rotating body 30 in contact with only the bearing member 35, rotation of the rotating body 30 becomes smooth, and detection accuracy can be improved. The bearing member 35 includes openings 35d and 35e exposing the rotating body 30 in upper and lower portions in an axial direction of the pen shaft main body 5a, and a part of the rotating body 30 is exposed. The exposed portion on the upper side of the rotating body 30 reflects the irradiation light L2 (a part of the irradiation light L1) from the light source 10, and the exposed portion on the lower side contacts a mouse pad, a desk, or the like.

The rotating body 30 is a small sphere or ball, and is formed of, for example, a metal, a resin, ceramic, and the like. Fine irregularities are randomly formed at a front surface 30a of the rotating body 30, but the rotating body 30 may have a pattern on the front surface 30a. Further, the rotating body 30 may include a front surface on which fine irregularities and a pattern are not formed.

The second reflection member 41 is a flat surface mirror having a small size, and reflects, toward the first detection member 51, the irradiation light L2 reflected by the rotating body 30. The second reflection member 41 is disposed at an optical path from the rotating body 30 to the first detection member 51. Further, the second reflection member 41 is disposed in a substantially intermediate height position between the rotating body 30 and the second detection member 82 at the inner side surface 5d of the pen shaft main body 5a in the side cross-sectional view. Note that, although not illustrated, when the light source 10 is an LED, an imaging lens is disposed at the optical path around the second reflection member 41.

As described above, by providing the first and second reflection members 25 and 41 at the optical path, light can be reflected in any direction, and a degree of freedom of an arrangement of the optical element can be increased.

The first detection member 51 receives the irradiation light L2 reflected by the rotating body 30, and acquires information about an operation amount and an operation direction. The first detection member 51 is disposed closer to the upper side than the second reflection member 41 at the second flat surface 4b of the substrate 4 in the side cross-sectional view. The first detection member 51 includes, for example, a light amount sensor array disposed in a 18 by 18 matrix, specifically, for example, a photodiode array, detects a speckle pattern and the like from the rotating body 30 by the light amount sensor array in a fixed time cycle, and achieves acquisition of a displacement and a movement direction of the rotating body 30 by correlating a series of patterns that change over time. The speckle pattern is a random light and darkness pattern generated by reflected light beams that interfere with each other when irradiation light is applied to an object front surface having fine irregularities. When laser is used as the light source 10, high resolution is obtained by detecting the speckle as described above.

An optical path of the operation direction acquisition unit 91 that detects a rotation amount and a rotation direction of the rotating body 30 will be described. The irradiation light L1 emitted from the light source 10 is incident on the first diffraction element 21. The irradiation light L1 incident on the first diffraction element 21 is diffracted obliquely downward and is incident on the first reflection member 25. The irradiation light L2 incident on the first reflection member 25 is reflected by the first reflection member 25, and is incident on the front surface 30a of the rotating body 30. The irradiation light L2 incident on the front surface 30a is reflected by the front surface 30a and is incident on the second reflection member 41. The irradiation light L2 incident on the second reflection member 41 is reflected by the second reflection member 41 and is incident on the first detection member 51. In the operation direction acquisition unit 91, the light source 10, the first diffraction element 21, and the first reflection member 25 constitute the first light projection system, and the second reflection member 41 and the first detection member 51 constitute the first light reception system.

The movable member 61 is a mechanical mechanism for a button switch that achieves switching of an operation. The electronic pen 100 has a function of a click operation by providing the movable member 61. The movable member 61 is provided in a recessed portion 5f formed at one place of an outer side surface 5e of the pen shaft main body 5a. The movable member 61 includes a button main body 62, a support portion 63, and a spring 64. The button main body 62 extends long in the first direction A parallel to an axis in which the pen shaft main body 5a extends. An upper portion of the button main body 62 is supported by the support portion 63 having a function of bearing so as to be able to rotate about an axis perpendicular to a page space, and one end of the spring 64 is held in a lower portion of the button main body 62. Note that another end of the spring 64 is fixed to a bottom of the recessed portion 5f of the pen shaft main body 5a. The button main body 62 of the movable member 61 is in a state of being housed in the recessed portion 5f of the pen shaft main body 5a against a biasing force of the spring 64 by applying an external force to the lower portion of the button main body 62. A hole that penetrates a side surface of the pen shaft main body 5a is formed in the recessed portion 5f of the pen shaft main body 5a, and the irradiation light L3 from the first diffraction element 21 can be incident on an inner surface 61a of the movable member 61. The third reflection member 71 is fixed to the inner surface 61a of the movable member 61.

The third reflection member 71 is a flat surface mirror having a small size, and reflects, toward the second detection member 82, the other part of the irradiation light L1 diffracted by the first diffraction element 21, that is, the irradiation light L3. When the movable member 61 is located at a first position SL1 described below, the third reflection member 71 is disposed such that the irradiation light L3 is incident on the third reflection member 71 and reflected toward the second detection member 82.

Figure 4:
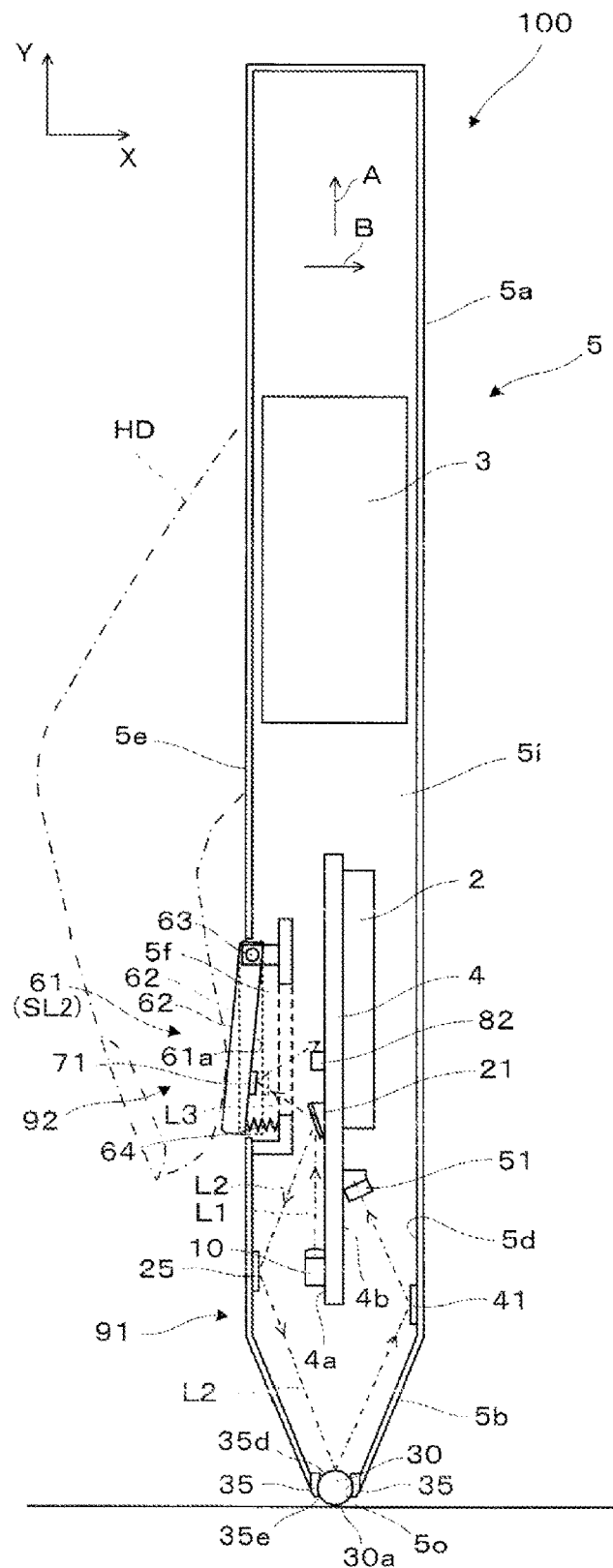
FIG. 4 is a diagram for illustrating a state where an external force is not applied to a movable member of the electronic pen.

An operation of the movable member 61 will be described below with reference to FIGS. 1 and 4. As illustrated in FIG. 1, the movable member 61 is moved or displaced to the first position SL1 in the button main body 62 when an external force is applied. As illustrated in FIG. 4, the movable member 61 is moved or displaced to a second position SL2 in the button main body 62 when the external force is not applied. In the illustrated example, in the movable member 61 moved to the first position SL1, the button main body 62 is brought into a state of being pushed by a finger and provided with the external force, and the lower portion of the button main body 62 moves in the second direction B with the support portion 63 as a fulcrum so as to fit in the recessed portion 5f of the pen shaft main body 5a (see FIG. 1). Further, in the movable member 61 moved to the second position SL2, the button main body 62 is brought into a state of being released from the finger and not being pushed, and the lower portion of the button main body 62 moves with the support portion 63 as the fulcrum so as to leave the recessed portion 5f of the pen shaft main body 5a to protrude from the pen shaft main body 5a (see FIG. 4). When the movable member 61 is located at the first position SL1, the third reflection member 71 reflects the irradiation light L3 diffracted by the first diffraction element 21 so as to cause the irradiation light L3 to be incident on the second detection member 82. Further, when the movable member 61 is located at the second position SL2, the third reflection member 71 reflects the irradiation light L3 diffracted by the first diffraction element 21 so as to cause the irradiation light L3 to be incident around the second detection member 82.

Note that the movable member 61 may include an additional mechanical mechanism for generating a click sound or a click sense in an operation of releasing a finger from the button main body 62, or when the button main body 62 is pushed by a finger.

The second detection member 82 can receive the irradiation light L3 (the other part of the irradiation light L1) from the light source 10, and detects that, according to a displacement state of the movable member 61, a specific operation, that is, a click operation is performed. The second detection member 82 is provided in a position different from a position of the first detection member 51, and is disposed so as to receive the other part of the irradiation light L1, that is, the irradiation light L3 from the light source 10 when the movable member 61 is located at the first position SL1. In the illustrated example, the second detection member 82 is disposed closer to the upper side than the first diffraction element 21 at the first flat surface 4a of the substrate 4 in the side cross-sectional view. By an incidence change in the irradiation light L3 due to switching of the movable member 61 between the first position SL1 and the second position SL2, a movement direction of the electronic pen 100 being a direction unintended by the user US when a specific operation is performed can be suppressed. In a case in which the movable member 61 is located at the first position SL1, when the second detection member 82 receives the irradiation light L3 at intensity that exceeds a predetermined threshold value, the second detection member 82 acquires, for example, operation information about a click-off by processing in the control unit 2 described below. Further, in a case in which the movable member 61 is located at the second position SL2, when the second detection member 82 stops receiving the irradiation light L3 at intensity that exceeds the predetermined threshold value, the second detection member 82 acquires, for example, operation information about a click-on by processing in the control unit 2. By setting an operation state of the click-on in the control unit 2 when the movable member 61 is located at the second position SL2, that is, when an external force is not applied to the movable member 61, occurrence of a vibration and an influence on an operation caused by the hand HD and the like of the user US, that is, an influence on an operation of the operation direction acquisition unit 91 by a force unintended by the user US being transmitted to the rotating body 30 via the pen shaft main body 5a can be suppressed, and a determination of a click operation can be accurately performed. Note that the setting of the click operation of the movable member 61 in the first position SL1 and the second position SL2 can be appropriately changed, and, for example, the click-on may be set in the first position SL1, and the click-off may be set in the second position.

An optical path of the operation detection unit 92 when the operation detection unit 92 detects an ON state of the second detection member 82, or a switching operation from OFF to ON (that is, when the movable member 61 is OFF in the first position SL1) will be described. The irradiation light L1 emitted from the light source 10 is incident on the first diffraction element 21. The irradiation light L1 incident on the first diffraction element 21 is diffracted obliquely upward and is incident on the third reflection member 71. The irradiation light L3 incident on the third reflection member 71 is reflected by the third reflection member 71 and is incident on the second detection member 82. In this case, the second detection member 82 outputs optical signal detection. In the operation detection unit 92, the light source 10 and the first diffraction element 21 constitute the second light projection system, and the second detection member 82 constitutes the second light reception system.

An optical path of the operation detection unit 92 when the operation detection unit 92 detects an off state of the second detection member 82, or a switching operation from ON to OFF (that is, when the movable member 61 is ON in the second position SL2) will be described. The irradiation light L1 emitted from the light source 10 is incident on the first diffraction element 21. The irradiation light L1 incident on the first diffraction element 21 is diffracted obliquely upward and is incident on the third reflection member 71. The irradiation light L3 incident on the third reflection member 71 is reflected by the third reflection member 71, but the reflected irradiation light L3 deviates from the optical path in the first position SL1 and is not thus incident on the second detection member 82. In this case, the second detection member 82 does not output optical signal detection.

The control unit 2 controls an operation of the light source 10, the first detection member 51, and the second detection member 82.

The power source 3 supplies power to the light source 10, the first detection member 51, the second detection member 82, and the control unit 2.

Figure 5:
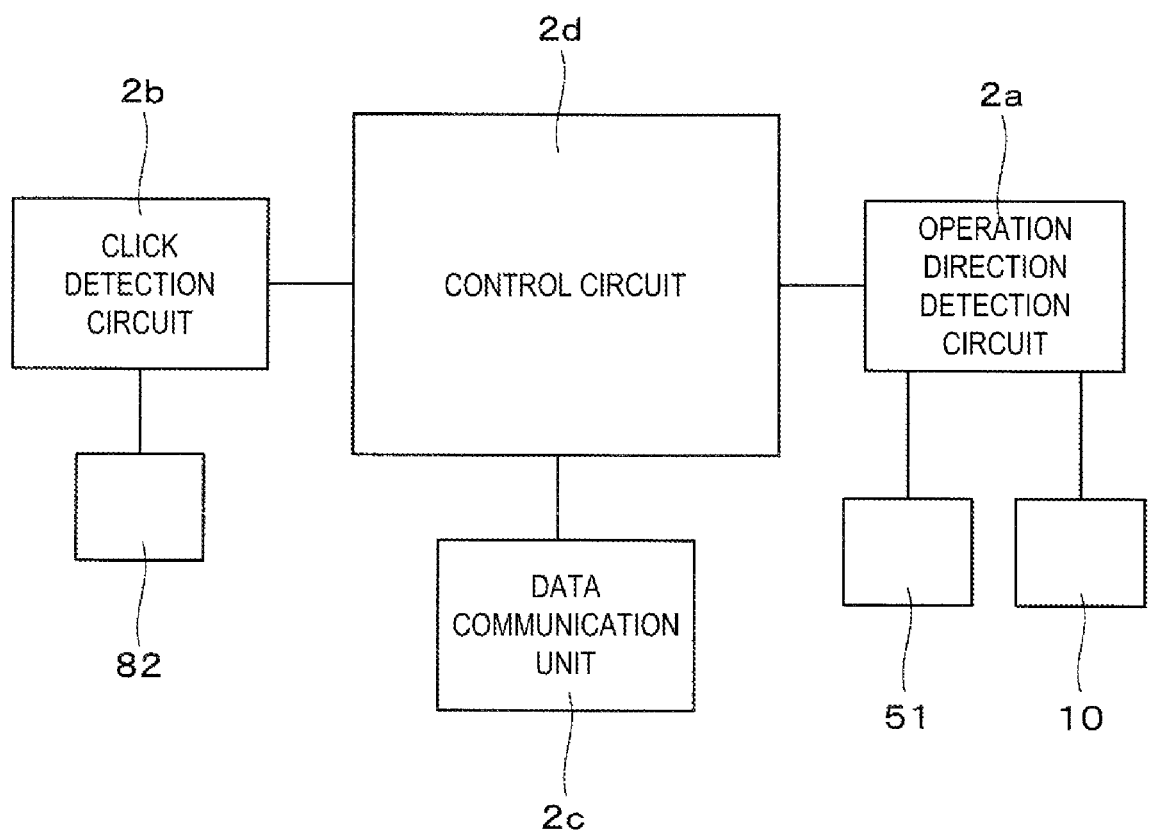
FIG. 5 is a diagram for illustrating a control unit of the electronic pen.

A detailed configuration of the control unit 2 will be described below with reference to FIG. 5.

The control unit 2 includes an operation direction detection circuit 2a, a click detection circuit 2b, a data communication unit 2c, and a control circuit 2d.

The operation direction detection circuit 2a operates the light source 10 and the first detection member 51 under control of the control circuit 2d. The operation direction detection circuit 2a causes the irradiation light L1 to be emitted from the light source 10. Further, the operation direction detection circuit 2a performs image processing of a speckle from the irradiation light L2 acquired by the first detection member 51, correlates a series of speckle patterns that change over time, and generates data about a displacement and a movement direction (an operation amount and an operation direction) of the rotating body 30. The operation direction detection circuit 2a outputs the data about the displacement and the movement direction of the rotating body 30 as horizontal or vertical two-dimensional displacement data with respect to a contact surface of the rotating body 30.

The click detection circuit 2b operates the second detection member 82 under control of the control circuit 2d. The click detection circuit 2b determines that the irradiation light L3 is detected when light having a predetermined threshold value or greater is received in the second detection member 82. When the click detection circuit 2b does not detect the irradiation light L3 by the second detection member 82 in the second position SL2 of the movable member 61, the click detection circuit 2b senses that a finger of the user US leaves the movable member 61, and outputs a click signal. The click detection circuit 2b can detect presence or absence of incidence of the irradiation light L3 on the second detection member 82 by switching of the movable member 61 between the first position SL1 and the second position SL2, and can thus output the click signal according to an operation of the user US.

The data communication unit 2c transmits a detection result in the first detection member 51 and the second detection member 82 to another electronic device such as a personal computer in a wireless or wired manner under control of the control circuit 2d. Specifically, the data communication unit 2c transmits the data about the displacement and the movement direction of the rotating body 30 generated by the operation direction detection circuit 2a. Further, the data communication unit 2c transmits the click signal output from the click detection circuit 2b.

The control circuit 2d controls an operation of the operation direction detection circuit 2a, the click detection circuit 2b, and the data communication unit 2c.

As described above, although not illustrated, for example, another optical member such as a lens may be provided at the optical path from the rotating body 30 to the first detection member 51 in the electronic pen 100. The irradiation light reflected by the rotating body 30 is incident on the optical member, and the incident irradiation light is emitted toward the first detection member 51.

Figure 6:
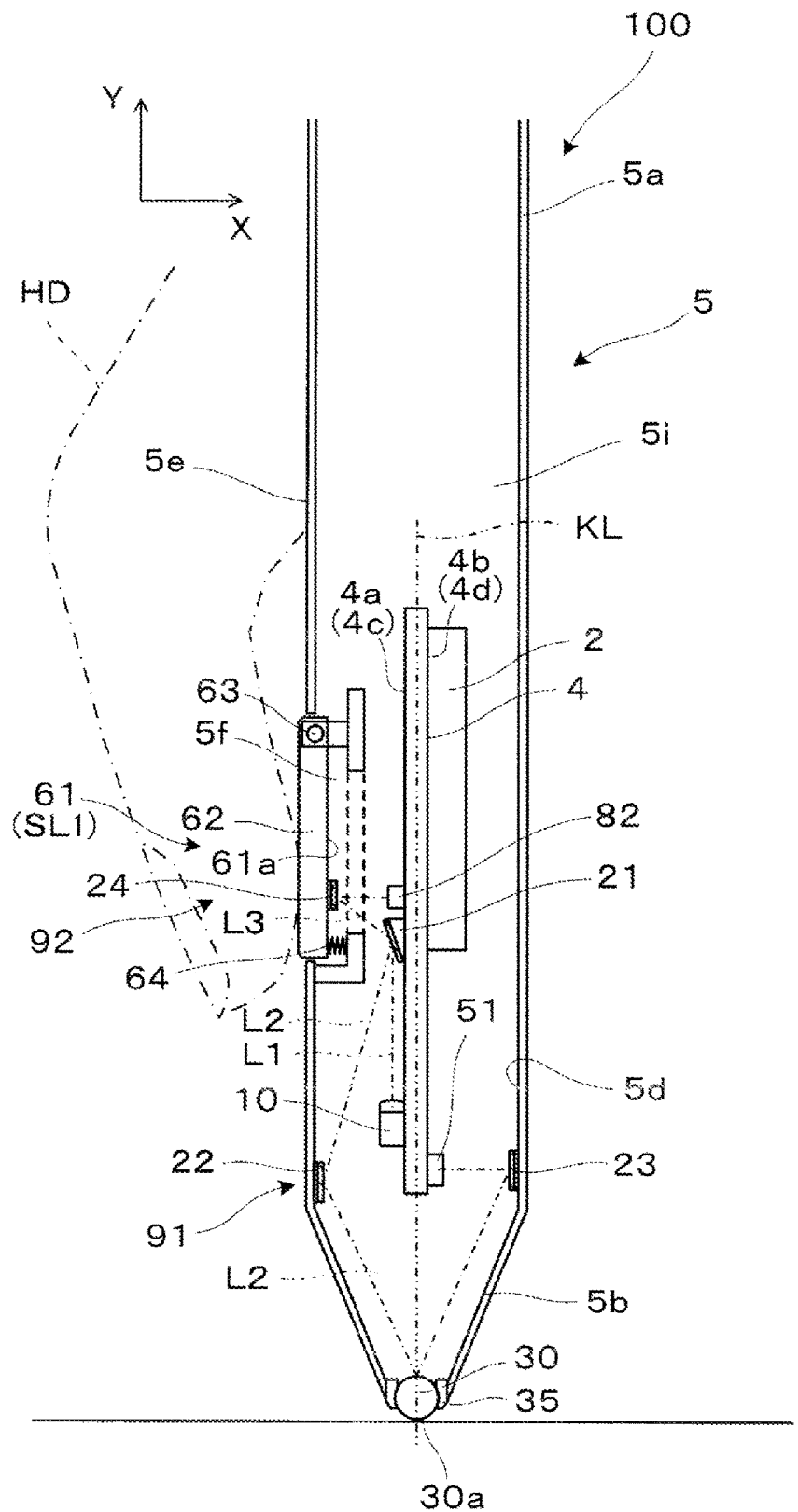
FIG. 6 is a longitudinal cross-sectional view for illustrating an electronic pen according to a modification example of the first embodiment.

Note that, as illustrated in FIG. 6, in the electronic pen 100, a second diffraction element 22 and a third diffraction element 23 may be disposed instead of the first reflection member 25 and the second reflection member 41 illustrated in FIG. 1. Specifically, the second diffraction element 22 is disposed at an optical path from the first diffraction element 21 to the rotating body 30. The second diffraction element 22 diffracts, toward the rotating body 30, the irradiation light L2 diffracted by the first diffraction element 21. The third diffraction element 23 is disposed at an optical path from the rotating body 30 to the first detection member 51. The third diffraction element 23 diffracts, toward the first detection member 51, the irradiation light L2 reflected by the rotating body 30.

As described above, by providing the second and third diffraction elements 22 and 23 at the optical path, light can be diffracted in any direction. Further, a lens function can be added, and a degree of freedom of an arrangement of the optical element can be increased.

Further, in the electronic pen 100, a fourth diffraction element 24 may be disposed instead of the third reflection member 71 disposed at the movable member 61. Specifically, the fourth diffraction element 24 diffracts, toward the second detection member 82, the other part of the irradiation light L1 (irradiation light L3) diffracted by the first diffraction element 21. When the movable member 61 is located at the first position SL1, the fourth diffraction element 24 diffracts the irradiation light L3 diffracted by the first diffraction element 21 so as to cause the irradiation light L3 to be incident on the second detection member 82.

Note that the second, third, and fourth diffraction elements 22, 23, and 24 can be a volume hologram and a surface relief hologram similarly to the first diffraction element 21.

The electronic pen 100 according to the first embodiment described above includes: the light source 10 configured to emit the irradiation light L1; the rotating body 30 configured to reflect the irradiation light L2 emitted from the light source 10 and rotate; the first detection member 51 configured to receive the irradiation light L2 reflected by the rotating body 30; and the first diffraction element 21 provided at an optical path from the light source 10 to the first detection member 51 and configured to diffract the irradiation light L1.

In the electronic pen 100 described above, by disposing the first diffraction element 21 that diffracts the irradiation light L1 from the light source 10 at the optical path from the light source 10 to the first detection member 51, a restriction on an arrangement of the light source 10 and the first diffraction element 21 is relaxed, and thus a size of the electronic pen 100 can be reduced.

Second Embodiment

An electronic pen according to a second embodiment of the present disclosure will be described below. Note that the electronic pen according to the second embodiment is obtained by modifying a part of the electronic pen according to the first embodiment, and description of common portions will be omitted.

Figure 7:
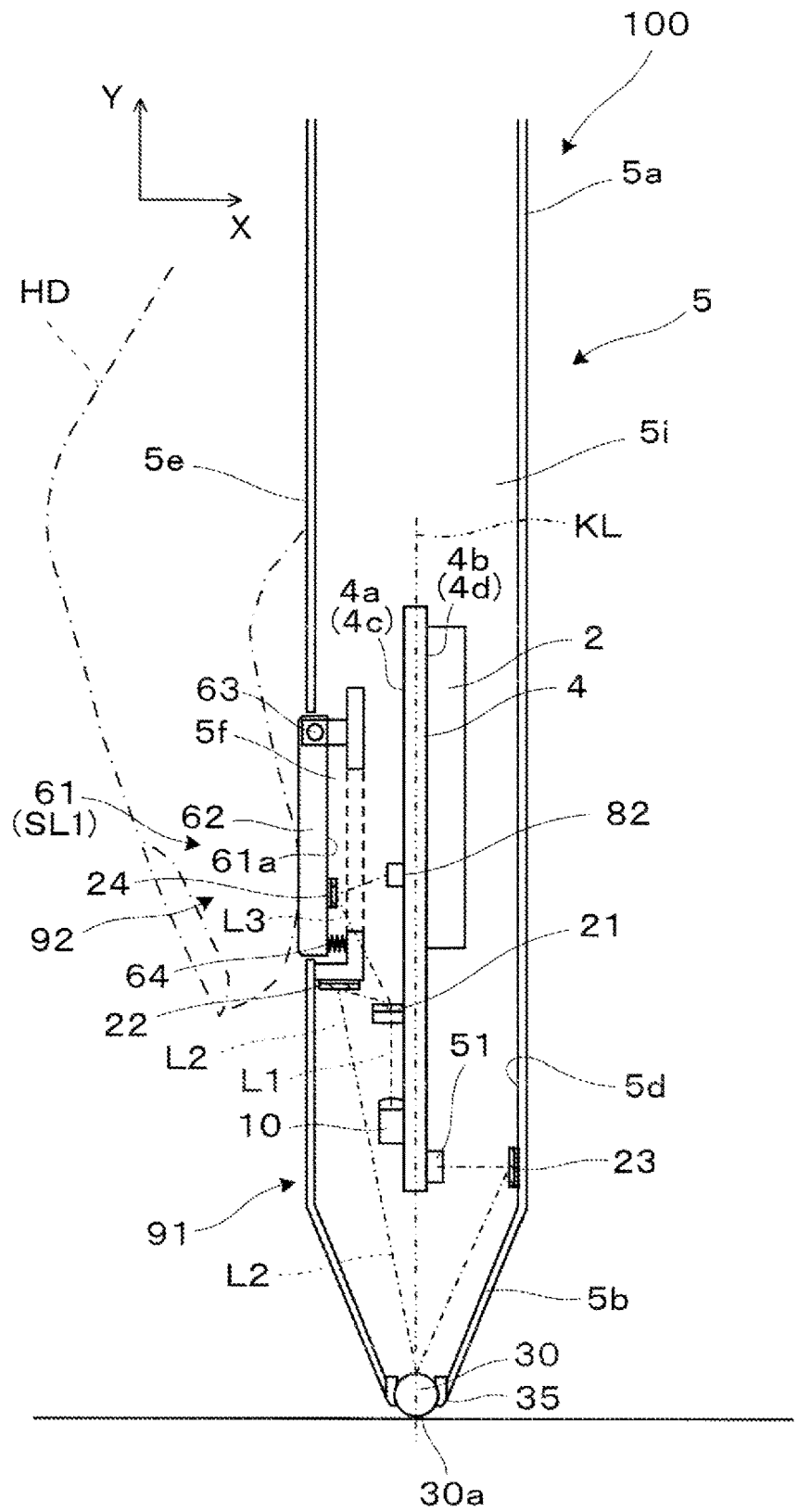
FIG. 7 is a longitudinal cross-sectional view for illustrating an electronic pen according to a second embodiment.

As illustrated in FIG. 7, in an electronic pen 100 according to the present embodiment, a first diffraction element 21 is a transmission-type diffraction element. The electronic pen 100 according to the present embodiment is configured to guide irradiation light L2 diffracted by the first diffraction element 21 toward a first detection member 51 by second and third diffraction elements 22 and 23, and to guide irradiation light L3 diffracted by the first diffraction element 21 toward a second detection member 82 by a fourth diffraction element 24. Also, in the present embodiment, each of the diffraction elements 21, 22, 23, and 24 can be a volume hologram and a surface relief hologram.

Figure 8:
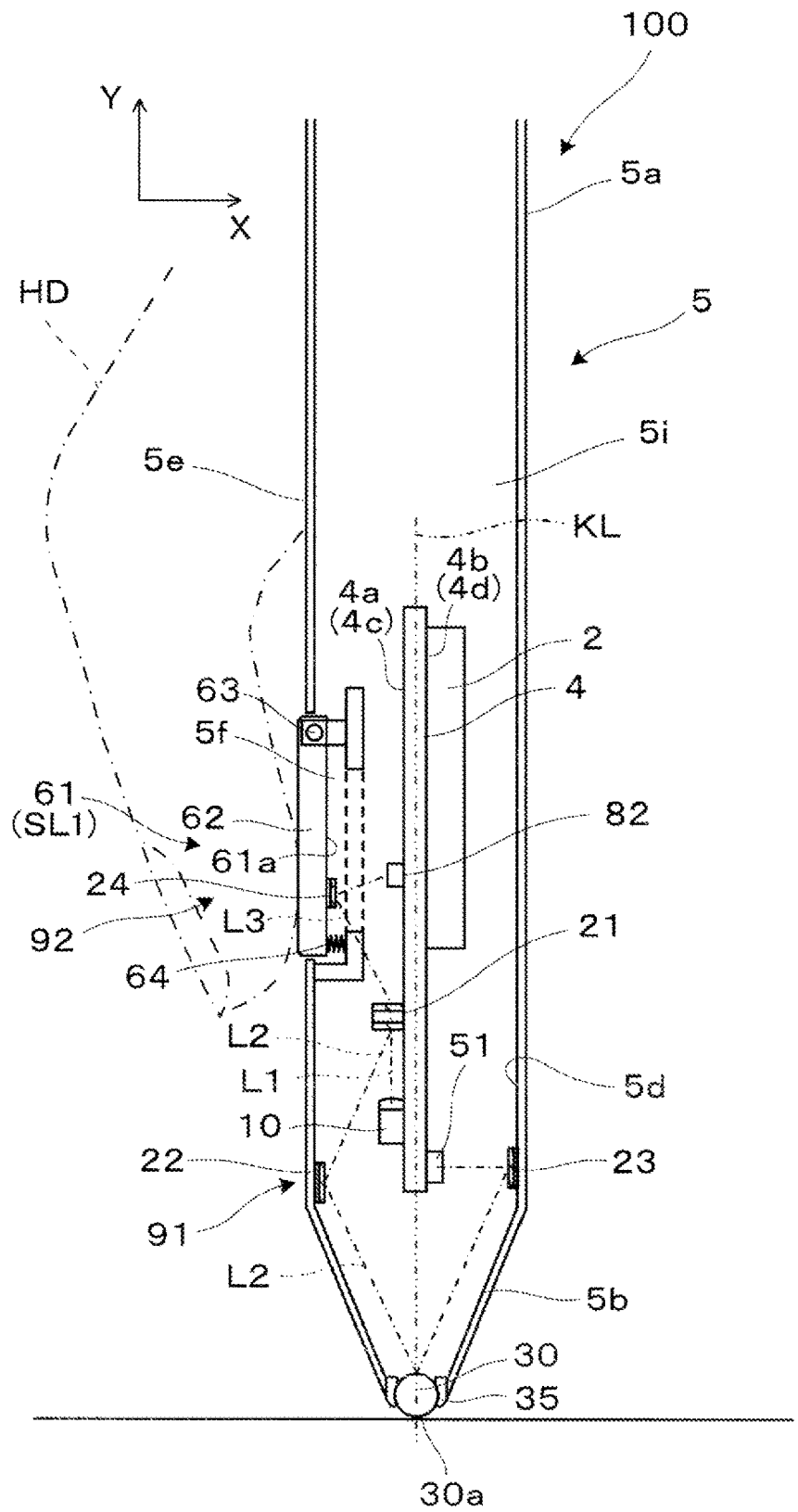
FIG. 8 is a longitudinal cross-sectional view for illustrating an electronic pen according to a modification example of the second embodiment.

Note that, as illustrated in FIG. 8, the first diffraction element 21 may be a reflection-type and transmission-type diffraction element in one. In FIG. 8, as the first diffraction element 21, a reflection diffraction element is disposed at one side of a transparent substrate, and a transmission diffraction element is disposed at the other side, but a diffraction element having a fringe having a function of transmitting and reflecting may be disposed at one side.

Third Embodiment

An electronic pen according to a third embodiment of the present disclosure will be described below. Note that the electronic pen according to the third embodiment is obtained by modifying a part of the electronic pen according to the first embodiment, and description of common portions will be omitted.

Figure 9:
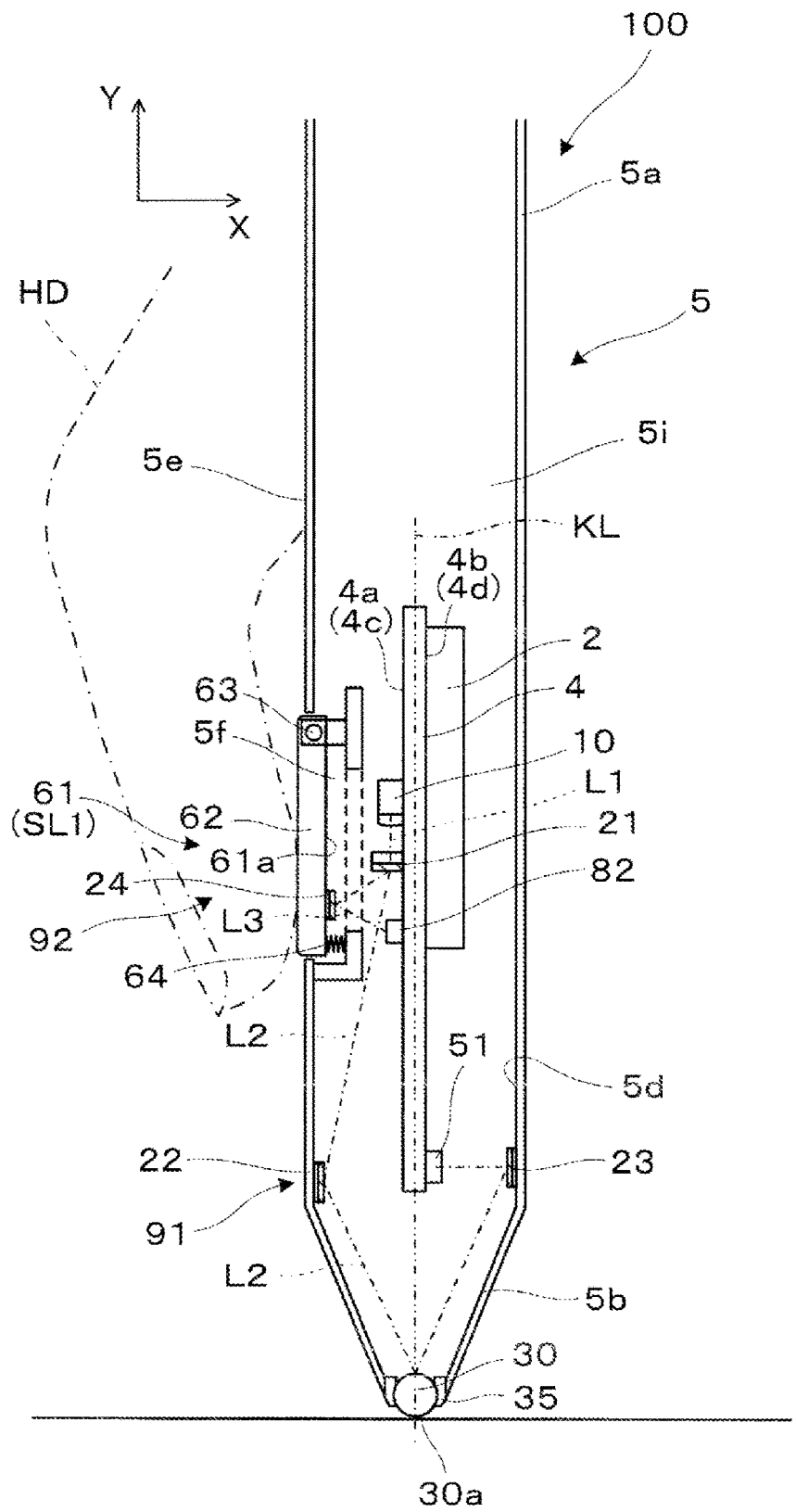
FIG. 9 is a longitudinal cross-sectional view for illustrating an electronic pen according to a third embodiment.

As illustrated in FIG. 9, in an electronic pen 100 according to the present embodiment, a first diffraction element 21 is a transmission-type diffraction element. In the present embodiment, the first diffraction element 21 is disposed at an optical path from a light source 10 to a rotating body 30, and on a front stage side of a second diffraction element 22. Further, the first diffraction element 21 is disposed between the rotating body 30 and the light source 10 in the side cross-sectional view.

Fourth Embodiment

An electronic pen according to a fourth embodiment of the present disclosure will be described below. Note that the electronic pen according to the fourth embodiment is obtained by modifying a part of the electronic pen according to the first embodiment, and description of common portions will be omitted.

Figure 10:
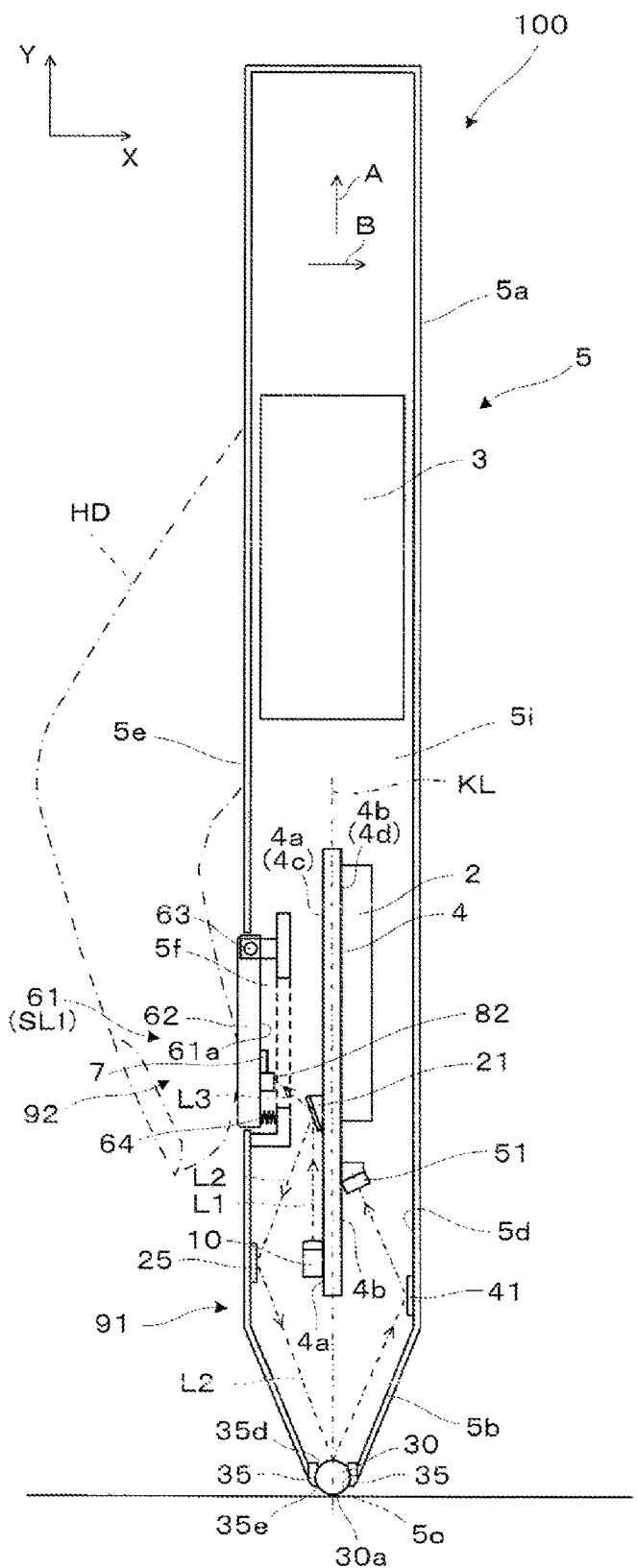
FIG. 10 is a diagram for illustrating a case in which a movable member of an electronic pen according to a fourth embodiment is located at a first position.
Figure 11:
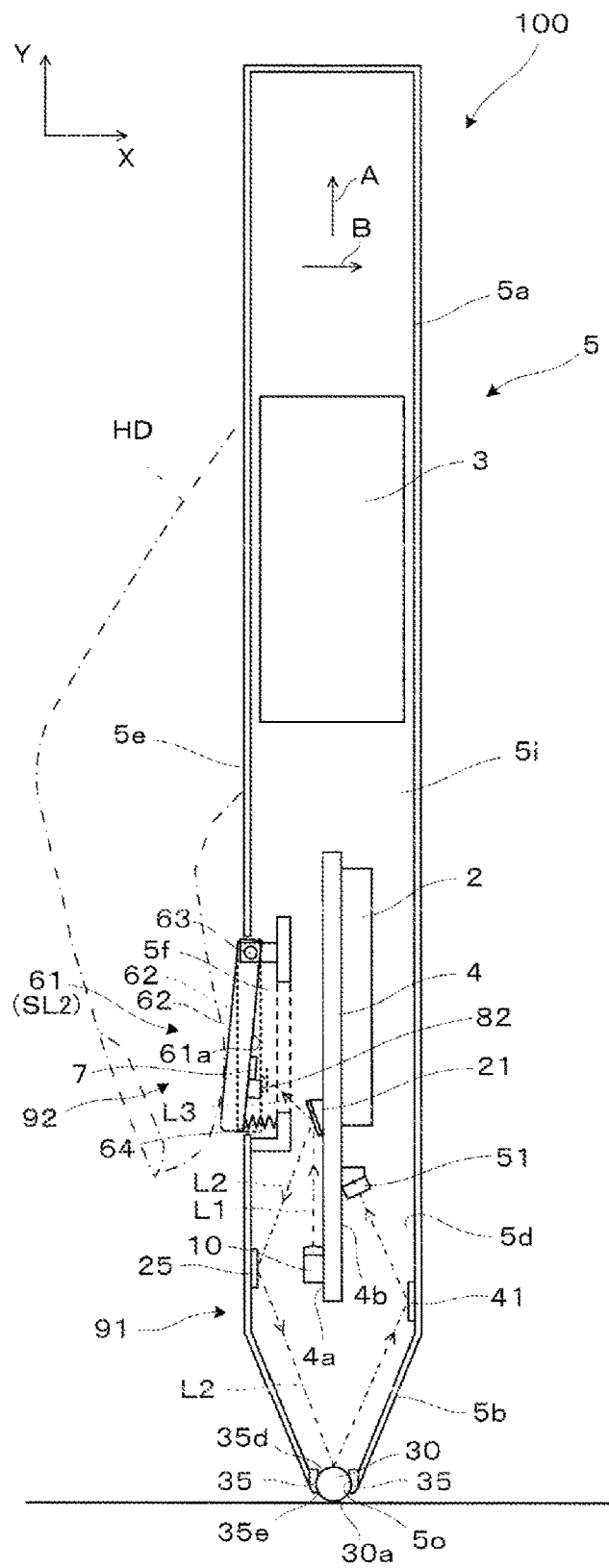
FIG. 11 is a diagram for illustrating a case in which the movable member of the electronic pen according to the fourth embodiment is located at a second position.

FIG. 10 is a cross-sectional view for illustrating a state where an external force is applied to a movable member of the electronic pen, and FIG. 11 is a cross-sectional view for illustrating a state where the external force is not applied to the movable member of the electronic pen.

As illustrated in FIG. 10 and the like, in an electronic pen 100 according to the present embodiment, a second detection member 82 is fixed to a movable member 61.

Specifically, the second detection member 82 is fixed to an inner surface 61a of a button main body 62 by bonding. The second detection member 82 is electrically coupled to a control unit 2 and the like via an FPC cable (not illustrated) and the like. Further, in the movable member 61, specifically, in the inner surface 61a of the button main body 62, a light absorption member 7 that has almost the same size as that of the second detection member 82 and absorbs irradiation light L3 is fixed to an upper side adjacent to the second detection member 82 by bonding.

The second detection member 82 is a photoreceptor element that receives light, and is disposed so as to receive the irradiation light L3 (another part of irradiation light L1) diffracted by a first diffraction element 21 when the movable member 61 is located at a first position SL1 (see FIG. 10). In a case in which the movable member 61 is located at the first position SL1, when the second detection member 82 receives the irradiation light L3 at intensity that exceeds a predetermined threshold value, the second detection member 82 acquires operation information about a click-off by processing in the control unit 2 (see FIG. 10). In a case in which the movable member 61 is located at a second position SL2, when the second detection member 82 stops receiving the irradiation light L3 at intensity that exceeds the predetermined threshold value, the second detection member 82 acquires operation information about a click-on by processing in the control unit 2 (see FIG. 11).

The light absorption member 7 can absorb the irradiation light L3. The light absorption member 7 is formed of a resin sheet or the like in which a light absorption material such as carbon is mixed, but a fine light trap structure can be provided at a front surface.

When the movable member 61 is located at the second position SL2, the irradiation light L3 diffracted by the first diffraction element 21 is incident on the light absorption member 7. In other words, when the movable member 61 is located at the second position SL2, the irradiation light L3 is absorbed by the light absorption member 7, and is not incident on the second detection member 82 (see FIG. 11).

Fifth Embodiment

An electronic pen according to a fifth embodiment of the present disclosure will be described below. Note that the electronic pen according to the fifth embodiment is obtained by modifying a part of the electronic pen according to the first embodiment and the fourth embodiment, and description of common portions will be omitted.

Figure 12:
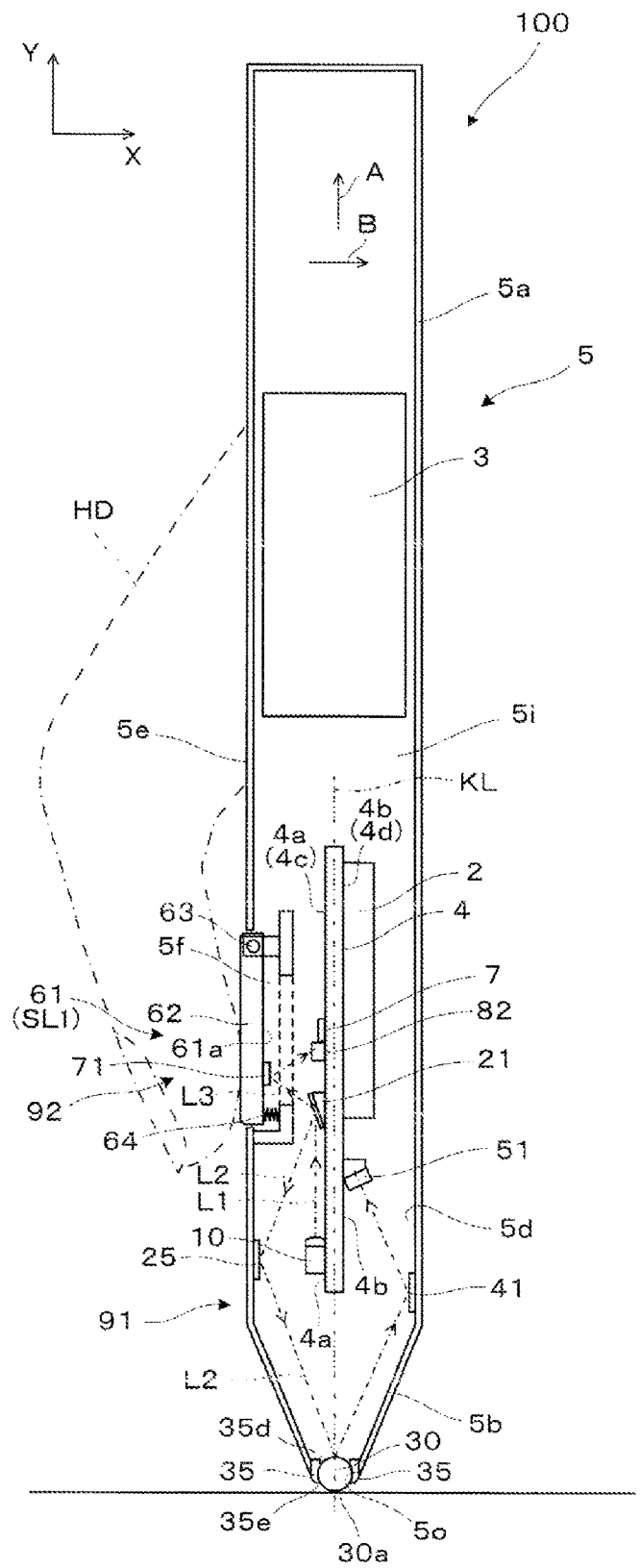
FIG. 12 is a diagram for illustrating a case in which a movable member of an electronic pen according to a fifth embodiment is located at a first position.
Figure 13:
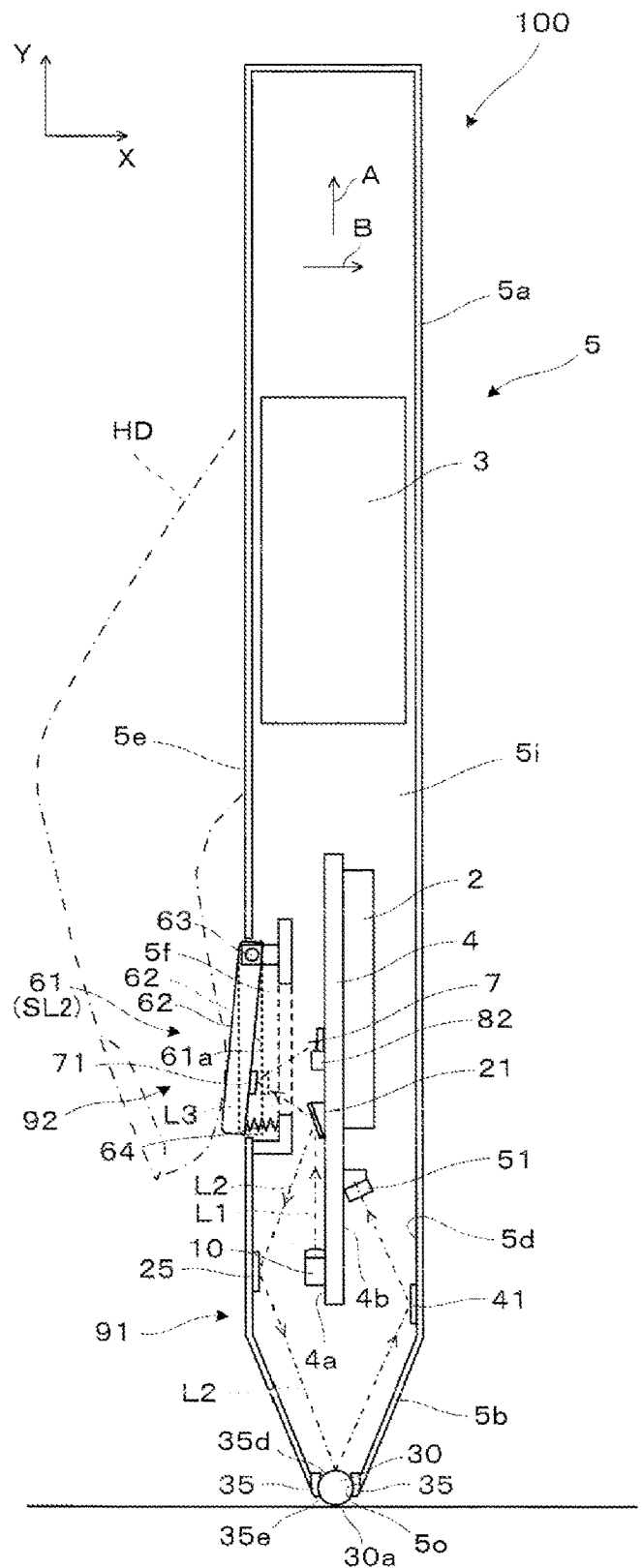
FIG. 13 is a diagram for illustrating a case in which the movable member of the electronic pen according to the fifth embodiment is located at a second position.

FIG. 12 is a cross-sectional view for illustrating a state where an external force is applied to a movable member of the electronic pen, and FIG. 13 is a cross-sectional view for illustrating a state where the external force is not applied to the movable member of the electronic pen.

As illustrated in FIG. 12 and the like, in an electronic pen 100 according to the present embodiment, a light absorption member 7 is provided at a substrate 4 together with a second detection member 82, a light source 10, and the like. The light absorption member 7 is disposed at a first flat surface 4a of the substrate 4 on one side of a first direction A in which a housing 5 extends with respect to the second detection member 82 and the light source 10. In the illustrated example, the light absorption member 7 is disposed adjacent to an upper side of the second detection member 82 above the light source 10. Further, a third reflection member 71 is disposed at a movable member 61. Note that a fourth diffraction element 24 may be disposed instead of the third reflection member 71.

When the movable member 61 is located at a second position SL2, irradiation light L3 diffracted by a first diffraction element 21 is incident on the light absorption member 7. In other words, when the movable member 61 is located at the second position SL2, the irradiation light L3 is incident on the light absorption member 7 and absorbed by the light absorption member 7, and is not incident on the second detection member 82 (see FIG. 13). By providing the light absorption member 7, the irradiation light L3 reflected by the third reflection member 71 corresponding to the second position SL2 being incident around the second detection member 82 at an unintended timing can be prevented from becoming a cause of stray light.

Note that, although not illustrated, in a case of a configuration in which the irradiation light L3 is incident on a lower side of the second detection member 82 when the movable member 61 is located at the second position SL2, the light absorption member 7 is disposed at the first flat surface 4a of the substrate 4 on another side of the first direction A in which the housing 5 extends with respect to the second detection member 82 and the light source 10. In other words, the light absorption member 7 is disposed adjacent to the lower side of the second detection member 82 above the light source 10.

Sixth Embodiment

An electronic pen according to a sixth embodiment of the present disclosure will be described below. Note that the electronic pen according to the sixth embodiment is obtained by modifying a part of the electronic pen according to the first embodiment, and description of common portions will be omitted.

Figure 14:
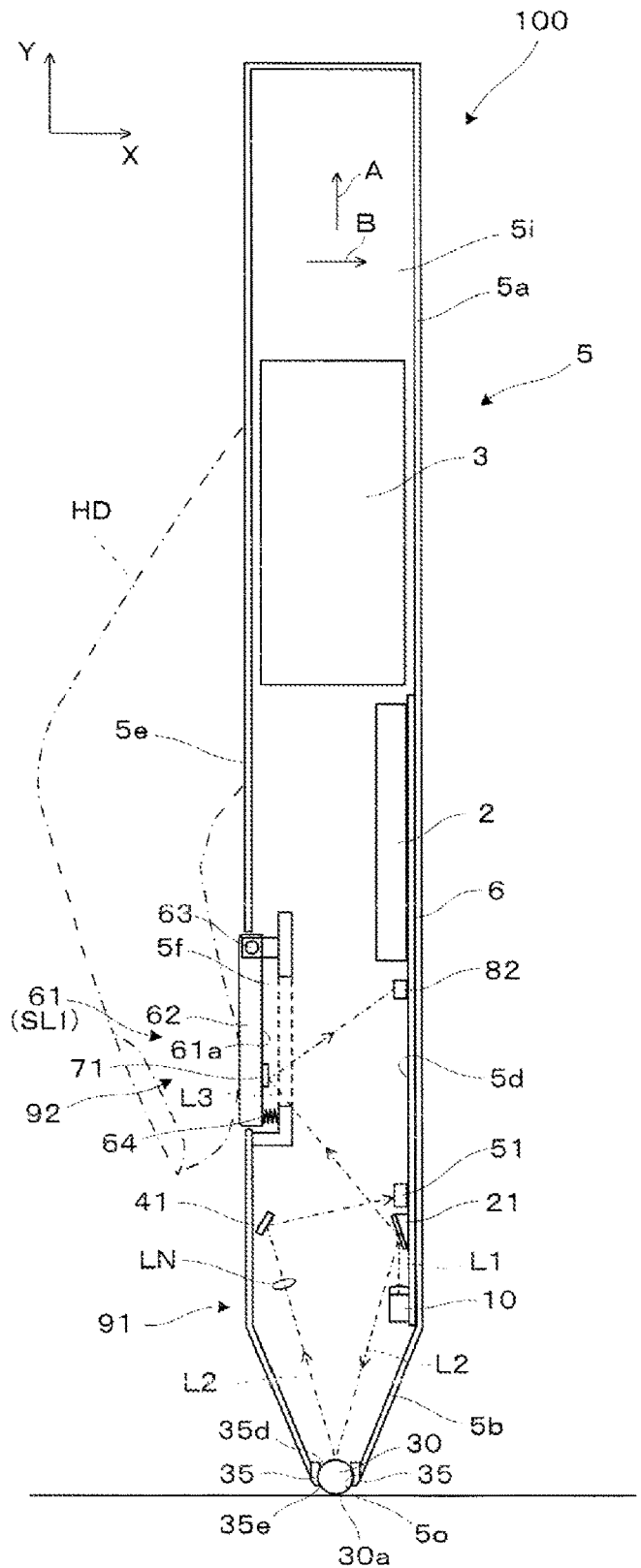
FIG. 14 is a longitudinal cross-sectional view for illustrating an electronic pen according to a sixth embodiment.

As illustrated in FIG. 14, an electronic pen 100 according to the present embodiment does not include a substrate 4. The electronic pen 100 according to the present embodiment is formed of a light source 10, a first diffraction element 21, an optical member LN, a second reflection member 41, a first detection member 51, a movable member 61, a third reflection member 71, a second detection member 82, a control unit 2, and a power source 3. The light source 10, the first diffraction element 21, the first detection member 51, the second detection member 82, and the control unit 2 are fixed to an inner side surface 5d of a housing 5 directly or via a reinforcing member 6. The optical member LN and the second reflection member 41 are fixed to the housing 5 via a member (not illustrated). In the electronic pen 100, the light source 10, the first diffraction element 21, a rotating body 30, the second reflection member 41, and the first detection member 51 function as an operation direction acquisition unit 91. Further, the light source 10, the first diffraction element 21, the movable member 61, the third reflection member 71, and the second detection member 82 function as an operation detection unit 92.

The optical member LN is disposed at an optical path from the rotating body 30 to the first detection member 51 of an optical path of the operation direction acquisition unit 91. Irradiation light L2 reflected by the rotating body 30 is incident on the optical member LN, and the incident irradiation light L2 is emitted toward the first detection member 51. The optical member LN is, for example, a condensing lens, and converges the irradiation light L2 reflected while being diffused by a front surface 30a of the rotating body 30.

Seventh Embodiment

An electronic pen according to a seventh embodiment of the present disclosure will be described below. Note that the electronic pen according to the seventh embodiment is obtained by modifying a part of the electronic pen according to the first embodiment, and description of common portions will be omitted.

Figure 15:
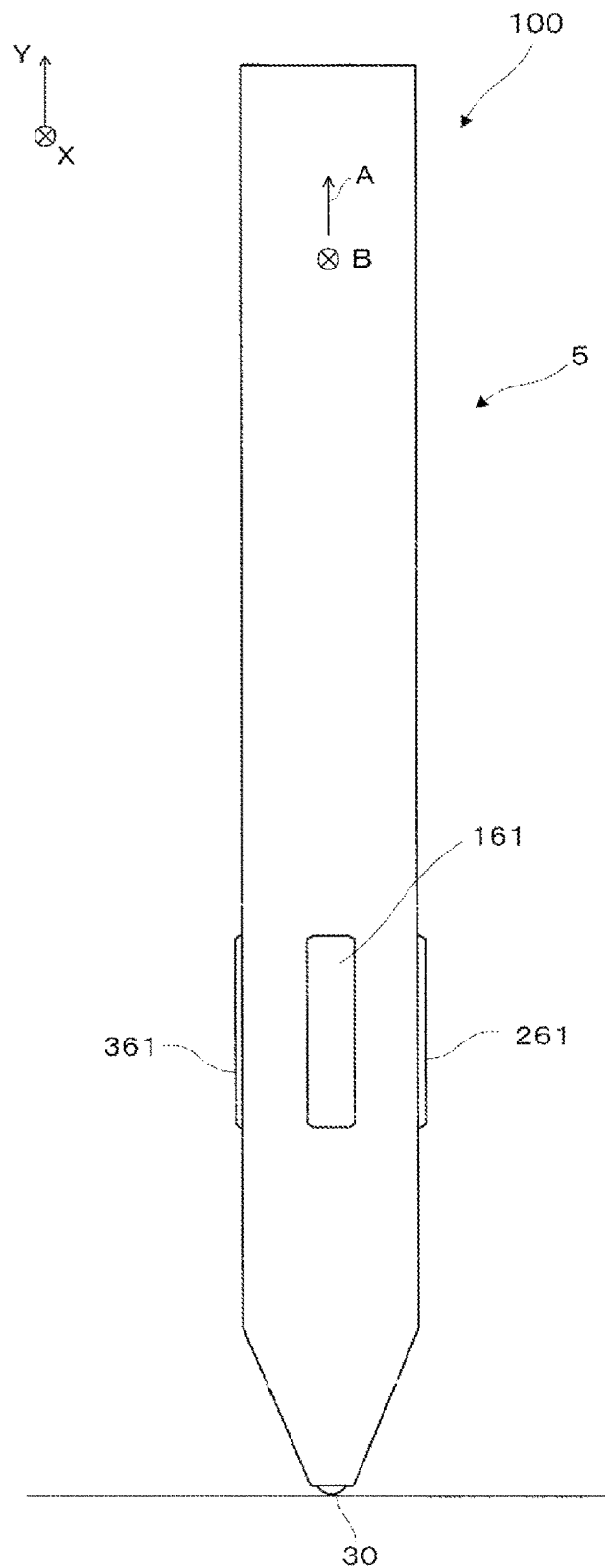
FIG. 15 is a side view for illustrating an electronic pen according to a seventh embodiment.

As illustrated in FIG. 15, an electronic pen 100 according to the present embodiment includes a plurality of movable members. Specifically, the electronic pen 100 includes a first movable member 161 for a forefinger, a second movable member 261 for a thumb, and a third movable member 361 for a middle finger. The first movable member 161, the second movable member 261, and the third movable member 361 can set different click functions or button functions.

Figure 16:
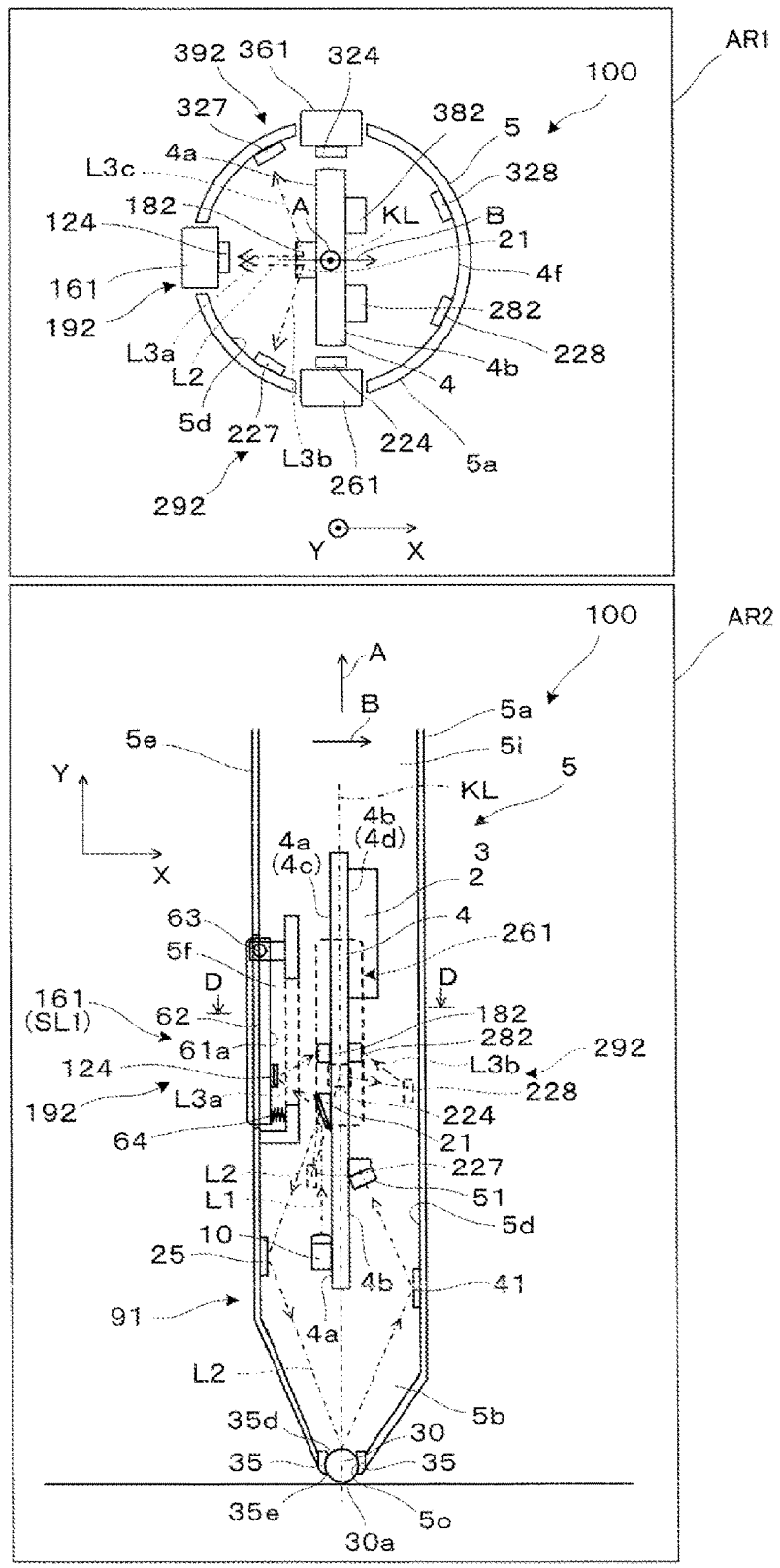
FIG. 16 is a transverse cross-sectional view taken along a line D-D and a longitudinal cross-sectional view for illustrating the electronic pen according to the seventh embodiment.

As illustrated in regions AR1 and AR2 in FIG. 16, in the electronic pen 100, a light source 10, a first diffraction element 21, the movable member 161 for the forefinger, a fourth diffraction element 124 for the forefinger, and a second detection member 182 for the forefinger are disposed at an optical path of an operation detection unit 192 for the forefinger. Further, the light source 10, the first diffraction element 21, a fifth diffraction element 227 for the thumb, the movable member 261 for the thumb, a fourth diffraction element 224 for the thumb, a sixth diffraction element 228 for the thumb, and a second detection member 282 for the thumb are disposed at an optical path of the operation detection unit 292 for the thumb. Further, the light source 10, the first diffraction element 21, a fifth diffraction element 327 for the middle finger, the movable member 361 for the middle finger, a fourth diffraction element 324 for the middle finger, a sixth diffraction element 328 for the middle finger, and a second detection member 382 for the middle finger are disposed at an optical path of the operation detection unit 292 for the middle finger. In the present embodiment, the light source 10, the first diffraction element 21, and the second detection member 182 for the forefinger are disposed at a first flat surface 4a of a substrate 4. A first detection member 51, the second detection member 282 for the thumb, the second detection member 382 for the middle finger, and a control unit 2 are disposed at a second flat surface 4b of the substrate 4. The fifth diffraction elements 227 and 327 and the sixth diffraction elements 228 and 328 are disposed at an appropriate place of an inner side surface 5d of a housing 5.

Irradiation light emitted from the light source 10 branches to four directions by the first diffraction element 21. Branching first irradiation light L2 is reflected by a first reflection member 25, a rotating body 30, and a second reflection member 41, and is incident on the first detection member 51. Branching second irradiation light L3a is diffracted by the fourth diffraction element 124 of the first movable member 161 for the forefinger, and is incident on the second detection member 182 for the forefinger. Branching third irradiation light L3b is diffracted by the fifth diffraction element 227 and then incident on the fourth diffraction element 224 of the second movable member 261 for the thumb. Subsequently, the irradiation light L3b is diffracted by the fourth diffraction element 224, then diffracted by the sixth diffraction element 228, and incident on the second detection member 282 for the thumb. Branching fourth irradiation light L3c is diffracted by the fifth diffraction element 327 and then incident on the fourth diffraction element 324 of the third movable member 361 for the middle finger. Subsequently, the irradiation light L3c is diffracted by the fourth diffraction element 324, then diffracted by the sixth diffraction element 328, and incident on the second detection member 382 for the middle finger.

Note that, in the present embodiment, a plurality of light sources 10 may be provided, and a diffraction element on which the irradiation light from the light source 10 is incident may be appropriately disposed.

Other Matter

The structure described above is an example, and various modifications can be made within a range in which a similar function can be achieved.

Figure 17:
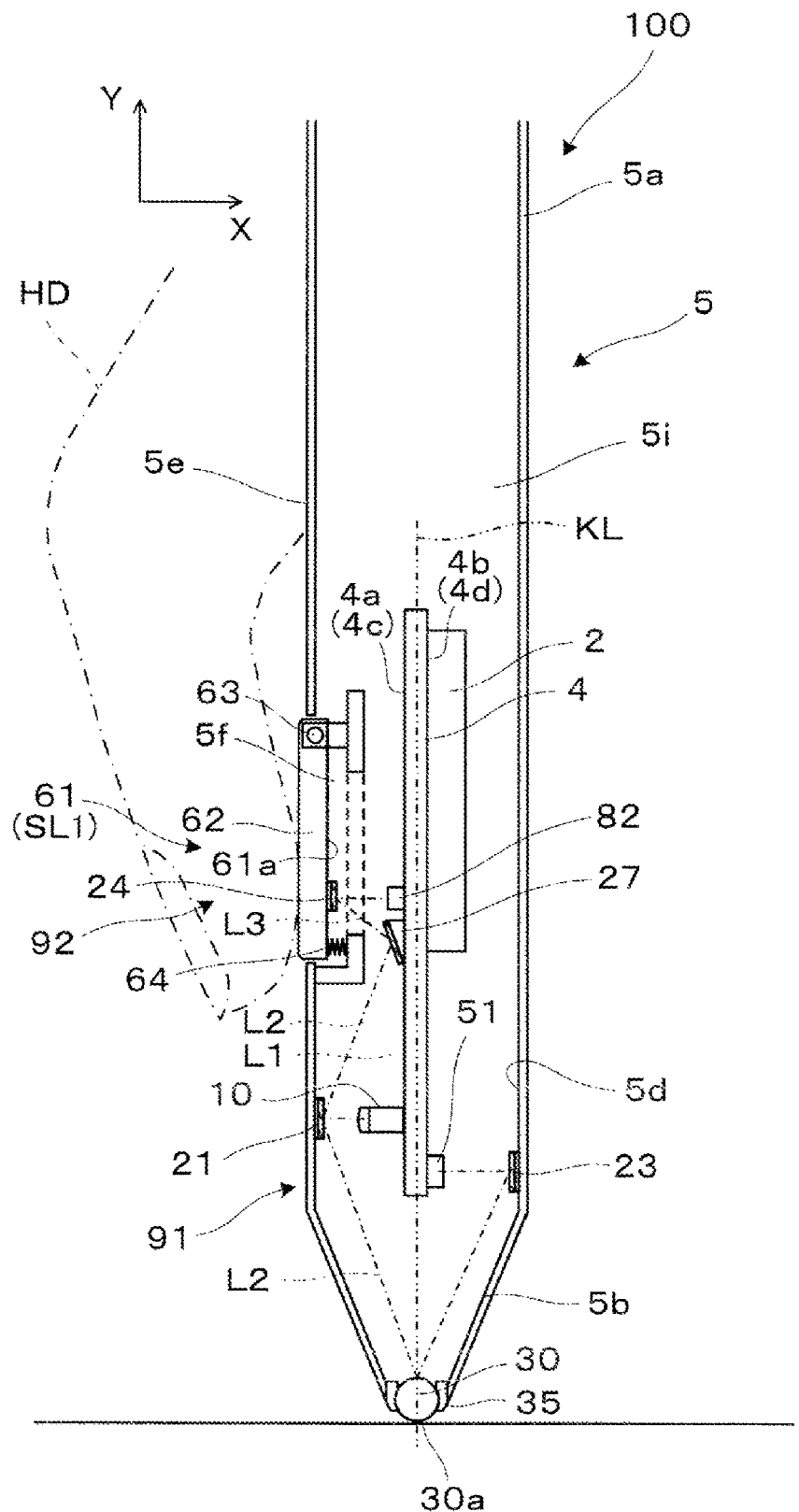
FIG. 17 is a longitudinal cross-sectional view for illustrating an electronic pen according to a modification example.

As described above, the example in which the first to third reflection members 25, 41, and 71 or the second to fourth diffraction elements 22, 23, and 24 are disposed as an optical element that guides the irradiation light L2 and L3 diffracted by the first diffraction element 21 toward the first detection member 51 or the second detection member 82 is described, but the number, a position, a combination, and the like of the reflection member and the diffraction element can be appropriately changed. Further, an arrangement of the first diffraction element 21 can also be appropriately changed. For example, as illustrated in FIG. 17, a first diffraction element 21 may be disposed below a movable member 61 at an inner side surface 5d of a housing 5. In this case, an operation direction acquisition unit 91 is formed of a light source 10, the first diffraction element 21, a rotating body 30, a third diffraction element 23, and a first detection member 51. Further, an operation detection unit 92 is formed of the light source 10, the first diffraction element 21, a fifth diffraction element 27, the movable member 61, a fourth diffraction element 24, and a second detection member 82. In the example in FIG. 17, the light source 10, the fifth diffraction element 27, and the second detection member 82 are disposed at a first flat surface 4a of a substrate 4. The first detection member 51 and a control unit 2 are disposed at a second flat surface 4b of the substrate 4.

An electronic pen in a specific aspect includes: a light source configured to emit irradiation light; a rotating body configured to rotate and to reflect the irradiation light emitted from the light source; a first detection member configured to receive the irradiation light reflected by the rotating body; and a first diffraction element provided at an optical path from the light source to the first detection member and configured to diffract the irradiation light.

In the electronic pen described above, by disposing the first diffraction element that diffracts the irradiation light from the light source at the optical path from the light source to the first detection member, a restriction on an arrangement of the light source and the first diffraction element is relaxed, and thus a size of the electronic pen can be reduced.

In the specific aspect, the electronic pen includes: a first reflection member provided at an optical path from the first diffraction element to the rotating body and configured to reflect, toward the rotating body, the irradiation light diffracted by the first diffraction element; and a second reflection member provided at an optical path from the rotating body to the first detection member and configured to reflect, toward the first detection member, the irradiation light reflected by the rotating body. In this case, light can be reflected in any direction, and a degree of freedom of an arrangement of the optical element can be increased.

In the specific aspect, the electronic pen includes: a second diffraction element provided at an optical path from the first diffraction element to the rotating body and configured to diffract, toward the rotating body, the irradiation light diffracted by the first diffraction element; and a third diffraction element provided at an optical path from the rotating body to the first detection member and configured to diffract, toward the first detection member, the irradiation light reflected by the rotating body. In this case, light can be diffracted in any direction. Further, a lens function can be added, and a degree of freedom of an arrangement of the optical element can be increased.

In the specific aspect, the first diffraction element is provided at an optical path from the light source to the rotating body, and the light source is provided between the rotating body and the first diffraction element in cross-sectional view.

In the specific aspect, the electronic pen includes an optical member provided at an optical path from the rotating body to the first detection member, and configured to receive incident light of the irradiation light reflected by the rotating body and emit the incident irradiation light toward the first detection member.

In the specific aspect, the first diffraction element includes at least one of a reflection-type diffraction element or a transmission-type diffraction element.

In the specific aspect, the first diffraction element is the transmission-type diffraction element, and is provided at an optical path from the light source to the rotating body, and the first diffraction element is provided between the rotating body and the light source in cross-sectional view.

In the specific aspect, the electronic pen includes a substrate provided with the light source and the first detection member, wherein a virtual line passes between one end and another end of the substrate in a second direction intersecting the first direction, the virtual line passing through a center of the rotating body and extending along a first direction in which an electronic pen housing extends. In this case, the optical elements can be disposed at both sides of the substrate, and space saving can be achieved. Further, by disposing the substrate near the center of the electronic pen housing, a relatively large area of the substrate can be secured.

In the specific aspect, the electronic pen includes a second detection member provided in a position different from a position of the first detection member and configured to receive the irradiation light, wherein the first diffraction element diffracts, toward the rotating body, a part of the irradiation light emitted from the light source, and diffracts, toward the second detection member, another part of the irradiation light emitted from the light source. In this case, power consumption of the electronic pen can be suppressed by a configuration in which the number of the light source is one, and the irradiation light from the light source branches to two light beams by the first diffraction element.

In the specific aspect, the electronic pen includes a movable member configured to move to a first position when an external force is applied, and configured to move to a second position when the external force is not applied, wherein the second detection member is provided so as to receive the other part of the irradiation light when the movable member is located at the first position. In this case, the electronic pen has a function of a click operation by providing the movable member. By an incidence change in the irradiation light due to switching of the movable member between the first position and the second position, a movement direction of the electronic pen being a direction unintended by a user when a specific operation is performed can be suppressed.

In the specific aspect, the electronic pen includes a light absorption member configured to absorb the irradiation light, wherein the second detection member and the light absorption member are provided at the movable member, and the light absorption member receives incident light of the irradiation light diffracted by the first diffraction element when the movable member is located at the second position. When the movable member is located at the second position, by causing the irradiation light to be incident on the light absorption member, stray light can be prevented from being incident on the second detection member, and detection accuracy of the second detection member can be improved.

In the specific aspect, the electronic pen includes a fourth diffraction element provided at the movable member, and configured to diffract, toward the second detection member, the other part of the irradiation light diffracted by the first diffraction element, wherein the fourth diffraction element diffracts the irradiation light diffracted by the first diffraction element such that the irradiation light is incident on the second detection member when the movable member is located at the first position.

In the specific aspect, the electronic pen includes a third reflection member provided at the movable member, and configured to reflect, toward the second detection member, the other part of the irradiation light diffracted by the first diffraction element, wherein the third reflection member reflects the irradiation light diffracted by the first diffraction element such that the irradiation light is incident on the second detection member when the movable member is located at the first position.

In the specific aspect, the electronic pen includes a light absorption member provided on one side in the first direction in which an electronic pen housing extends with respect to the light source, and configured to absorb the irradiation light, wherein the light absorption member receives incident light of the irradiation light diffracted by the first diffraction element when the movable member is located at the second position. When the movable member is located at the second position, by causing the irradiation light to be incident on the light absorption member, stray light can be prevented from being incident on the second detection member, and detection accuracy of the second detection member can be improved.

What is claimed is:
1. An electronic pen, comprising:
a light source configured to emit irradiation light;
a rotating body configured to rotate and to reflect the irradiation light emitted from the light source;
a first detection member configured to receive the irradiation light reflected by the rotating body; and
a first diffraction element provided at an optical path from the light source to the first detection member and configured to diffract the irradiation light, wherein
the first diffraction element is provided at an optical path from the light source to the rotating body, and
the light source is provided between the rotating body and the first diffraction element in a cross-sectional view.
2. The electronic pen according to claim 1, comprising:
a first reflection member provided at an optical path from the first diffraction element to the rotating body and configured to reflect, toward the rotating body, the irradiation light diffracted by the first diffraction element; and
a second reflection member provided at an optical path from the rotating body to the first detection member and configured to reflect, toward the first detection member, the irradiation light reflected by the rotating body.
3. The electronic pen according to claim 1, comprising:
a second diffraction element provided at an optical path from the first diffraction element to the rotating body and configured to diffract, toward the rotating body, the irradiation light diffracted by the first diffraction element; and a third diffraction element provided at an optical path from the rotating body to the first detection member and configured to diffract, toward the first detection member, the irradiation light reflected by the rotating body.

4. The electronic pen according to claim 1, comprising an optical member provided at an optical path from the rotating body to the first detection member, and configured to receive incident light of the irradiation light reflected by the rotating body and emit the incident irradiation light toward the first detection member.

5. The electronic pen according to claim 1, wherein the first diffraction element includes at least one of a reflection-type diffraction element and a transmission-type diffraction element.

6. The electronic pen according to claim 5, wherein the first diffraction element is the transmission-type diffraction element, and is provided at an optical path from the light source to the rotating body, and the first diffraction element is provided between the rotating body and the light source in a cross-sectional view.

7. The electronic pen according to claim 1, comprising a substrate provided with the light source and the first detection member, wherein a virtual line passes between one end and another end of the substrate in a second direction intersecting the first direction, the virtual line passing through a center of the rotating body and extending along a first direction in which an electronic pen housing extends.

8. The electronic pen according to claim 1, comprising a second detection member provided at a position different from a position of the first detection member and configured to receive the irradiation light, wherein the first diffraction element diffracts, toward the rotating body, a part of the irradiation light emitted from the light source, and diffracts, toward the second detection member, another part of the irradiation light emitted from the light source.

9. The electronic pen according to claim 8, comprising a movable member configured to move to a first position when an external force is applied, and configured to move to a second position when the external force is not applied, wherein the second detection member is provided so as to receive the other part of the irradiation light when the movable member is located at the first position.

10. The electronic pen according to claim 9, comprising a light absorption member configured to absorb the irradiation light, wherein the second detection member and the light absorption member are provided at the movable member, and the light absorption member receives incident light of the irradiation light diffracted by the first diffraction element when the movable member is located at the second position.

11. The electronic pen according to claim 9, comprising a fourth diffraction element provided at the movable member, and configured to diffract, toward the second detection member, the other part of the irradiation light diffracted by the first diffraction element, wherein the fourth diffraction element diffracts the irradiation light diffracted by the first diffraction element such that the irradiation light is incident on the second detection member when the movable member is located at the first position.

12. The electronic pen according to claim 9, comprising a third reflection member provided at the movable member, and configured to reflect, toward the second detection member, the other part of the irradiation light diffracted by the first diffraction element, wherein the third reflection member reflects the irradiation light diffracted by the first diffraction element such that the irradiation light is incident on the second detection member when the movable member is located at the first position.

13. The electronic pen according to claim 11, comprising a light absorption member provided on one side in the first direction in which an electronic pen housing extends, with respect to the light source, and configured to absorb the irradiation light, wherein the light absorption member receives incident light of the irradiation light diffracted by the first diffraction element when the movable member is located at the second position.

* * * * *